United States Patent [19]

Gingrich et al.

[11] Patent Number: 5,133,634
[45] Date of Patent: Jul. 28, 1992

[54] RAMP LIFTER DEVICE

[75] Inventors: Eli L. Gingrich, Fredericksburg; Theodore A. Lutton, Wooster, both of Ohio

[73] Assignee: Kidron, Inc., Kidron, Ohio

[21] Appl. No.: 615,090

[22] Filed: Nov. 19, 1990

[51] Int. Cl.⁵ .............................. E01D 1/00
[52] U.S. Cl. .................... 414/537; 14/71.1
[58] Field of Search ............ 414/537, 921, 462; 14/71.1, 71.3, 71.5

[56] References Cited

U.S. PATENT DOCUMENTS

| | | |
|---|---|---|
| 2,370,427 | 2/1945 | Sherry . |
| 3,458,073 | 7/1969 | Dawson ............. 414/462 |
| 3,511,393 | 5/1970 | Abromavage et al. . |
| 3,711,882 | 1/1973 | Iller ............. 414/537 X |
| 3,730,361 | 5/1973 | Haynes ............. 414/537 |
| 3,870,179 | 3/1975 | Noble et al. . |
| 3,933,258 | 1/1976 | Forsyth et al. . |
| 4,078,678 | 3/1978 | Tordella ............. 414/537 |
| 4,131,209 | 12/1978 | Manning . |
| 4,198,187 | 4/1989 | Mountz ............. 414/537 |
| 4,242,032 | 12/1980 | Whiteman et al. ....... 414/537 |
| 4,294,571 | 10/1981 | Tordella ............. 414/537 |
| 4,601,632 | 7/1986 | Agee . |
| 4,685,857 | 8/1987 | Goeser et al. ....... 414/537 X |
| 4,722,109 | 2/1988 | Mountz ............. 414/537 X |
| 4,759,682 | 7/1988 | Hood . |
| 4,850,788 | 7/1989 | Dickson ............. 414/537 |
| 4,900,217 | 2/1990 | Nelson ............. 414/537 |
| 4,929,018 | 5/1990 | Carty . |
| 4,958,979 | 9/1990 | Svensson ............. 414/921 X |
| 5,026,243 | 6/1991 | Dell ............. 414/537 X |
| 5,052,879 | 10/1991 | Wolfe ............. 414/921 X |

FOREIGN PATENT DOCUMENTS

| | | | |
|---|---|---|---|
| 2346050 | 3/1975 | Fed. Rep. of Germany ...... 414/537 |
| 58-93631 | 6/1983 | Japan ............. 414/537 |
| 2009097 | 6/1979 | United Kingdom ............. 414/462 |

OTHER PUBLICATIONS

Todco Rollaramp Specification.

Primary Examiner—Robert J. Spar
Assistant Examiner—Robert S. Katz
Attorney, Agent, or Firm—Calfee, Halter & Griswold

[57] ABSTRACT

A ramp lifter device is provided which is adapted to elevate the end of a loading ramp from its initial, extended position to the floor height of a trailer. A trailer chassis provides a storage area for the loading ramp between longitudinal frame members. A ramp carrier box is secured between opposing frame members of the trailer chassis. The ramp includes a ramp carriage having extension rods that are slidingly received along the ramp carrier box. The ramp lifter device includes a reinforcement member attached to a bottom cross member towards one end of the ramp, and a handle. Selectively applying a downward force on the handle forces a pivot rod on the ramp lifter device against the ramp carriage extension rods, which pivots the reinforcement member upwardly, and hence elevates the end of the ramp to the level of the trailer floor. The loading ramp can be manually moved forward and lowered so that ramp hooks on the end of the ramp engage corresponding ramp pockets on the end of the trailer body.

10 Claims, 5 Drawing Sheets

RAMP LIFTER DEVICE

TECHNICAL FIELD

The present invention relates generally to a device for elevating the end of a loading ramp from its initial, extended position to the floor height of a vehicle body. In particular, the invention relates to a ramp lifter device which is adapted to apply pivotal force against ramp carriage extension rods to raise the end of the loading ramp to the height of the vehicle body floor.

BACKGROUND

Conventional trucks or trailers in the industry can include a loading ramp stored in a ramp carrier box mounted within the truck or trailer chassis. The ramp can be withdrawn from the carrier box to facilitate loading and unloading of cargo from the rear of the truck or trailer.

For example, Carty U.S. Pat. No. 4,929,018, discloses a truck chassis which provides storage space for a loading ramp between the longitudinal frame members of the chassis. The ramp is received between an opposing pair of angle brackets attached to the inner face of each frame member. During loading and unloading of cargo from the truck, the ramp is withdrawn from the storage area and the forward end of the ramp is set on the ground. The rear end of the ramp is then manually lifted upwardly and forwardly until a pair of hooks of the end of the ramp engage an upstanding portion of the truck body.

Similarly, Abromavage et al., U.S. Pat. No. 3,511,393, discloses a loading ramp for a truck wherein the rear end of the ramp is manually lifted upwardly and forwardly until a pair of hooks on the rear end of the ramp engage corresponding brackets on the rear of the truck bed.

Additionally, Sherry U.S. Pat. No. 2,370,427, discloses a portable ramp for vehicles that is stored between opposing frame members in the chassis of a truck. The rear end of the ramp includes a hooked end which is adapted to engage a pivotal angle bar mounted towards the front end of the storage area. As the ramp is withdrawn from the storage area, the hooked end engages the angle bar, which pivots upwardly to elevate the end of the ramp to substantially the floor height of the trailer.

These ramp storage arrangements, however, are not without drawbacks. For example, the Carty and Abromavage ramps must be manually lifted upwardly and forwardly until the ramp hooks engage a portion of the truck body. This manual lifting can cause fatigue or physical injury. Moreover, the dimensions of the ramp are limited by the amount of weight a typical person can safely lift. Additionally, the Sherry ramp requires structural changes to the floor of the vehicle, which limits the weight of the cargo that can be loaded into and unloaded from the vehicle.

SUMMARY

The present invention provides a new and useful ramp lifter device for lifting a loading ramp from its initial, extended position to the floor height of a vehicle body.

According to one aspect of the present invention, the loading ramp is stored within a ramp carrier box mounted between the longitudinal frame members of a vehicle chassis. The ramp carrier box is secured between opposing frame members and is adapted to slidingly receive the loading ramp therein. The ramp includes a ramp carriage having extension rods pivotally attached to a bottom cross member of the ramp. The extension rods are adapted to slidingly support the ramp along the ramp carrier box.

To remove the ramp from the ramp carrier box, such as during loading and unloading of cargo from the rear of the vehicle body, the ramp is adapted to be withdrawn from its stored position in the ramp carrier box and have the forward end set on the ground, while the rear end remains supported on the extension rods at the level of the ramp carrier box.

The ramp lifter device includes a reinforcement member pivotally attached to the bottom of the ramp at a position slightly rearwardly from the extension member attachment. Additionally, a pivot rod extends laterally across the ramp lifter device and is attached thereto. The ramp lifter device also includes a handle which is adapted to be manually forced downwardly to elevate the rear end of the loading ramp. In particular, moving the handle of the ramp lifter device downwardly forces the pivot rod to engage the top surface of the ramp carriage extension rods, which thereby pivots the reinforcement member upwardly, and hence elevates the rear end of the loading ramp to the floor height of the vehicle body.

The elevated ramp can then be manually moved forward and lowered until ramp hooks attached to the end of the loading ramp engage corresponding ramp pockets on the end of the vehicle body.

To store the elevated loading ramp in the ramp carrier box, the above procedure is reversed, whereby the handle is initially moved downwardly to elevate the ramp and disengage the ramp hooks from the ramp pockets. The ramp lifter device is then folded flush with the bottom of the loading ramp, which lowers the rear end of the ramp to the height of the ramp carrier box. The ramp is then pushed back into the ramp carrier box.

Further features and advantages of the present invention will become apparent from the following detailed description and accompanying drawings which form a part of the specification.

DETAILED DESCRIPTION OF THE PREFERRED EMBODIMENT

Figure 1:
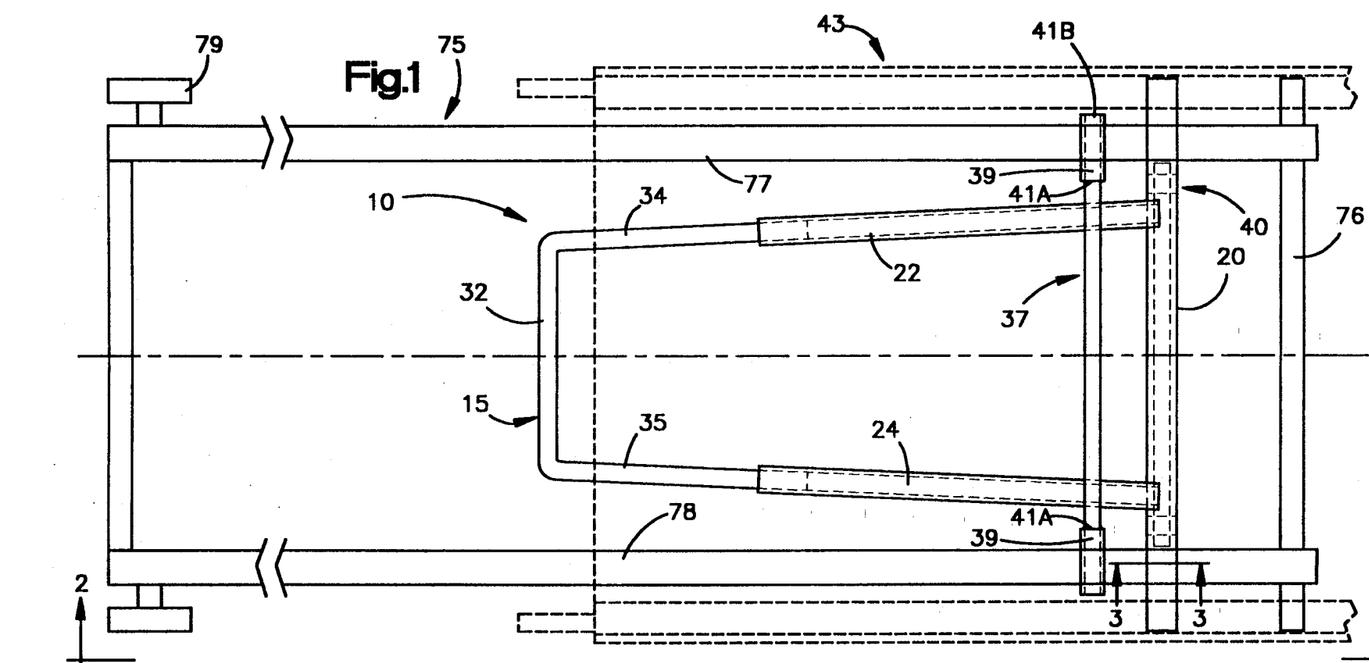
FIG. 1 is a top plan view of a ramp lifter device constructed in accordance with the present invention.

Referring to the drawings, and initially to FIG. 1, a ramp lifter device, indicated generally at 10, is illustrated. The ramp lifter device 10 is formed from steel or other metal, and includes a handle, indicated generally at 15, and a reinforcement member 20, interconnected by two substantially parallel lever arms 22, 24.

Figure 2:
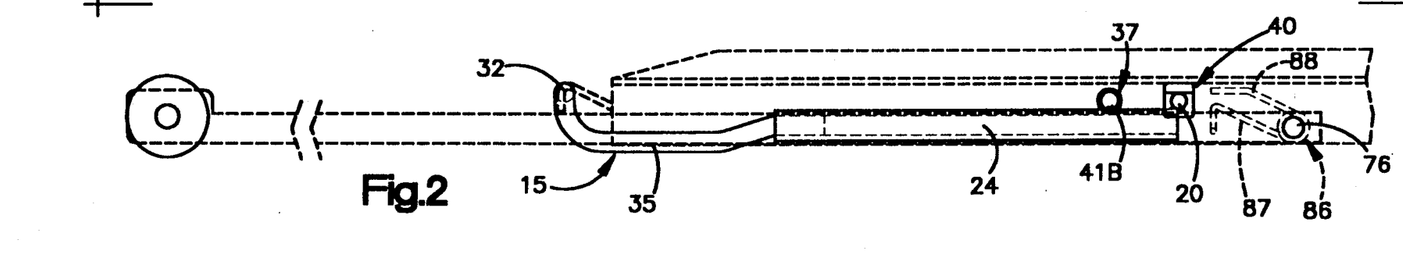
FIG. 2 is a sectional side view of the ramp lifter device taken along the plane described substantially by the lines 2—2 of FIG. 1.

As shown in FIGS. 1 and 2, the handle 15 is generally U-shaped in cross-sectional design, and includes an end piece 32 and two tubular rods 34, 35, integrally attached to a respective lever arm 22, 24. The lever arms 22, 24 are also generally tubular in shape and are attached at their distal ends, such as by welding, to the bottom surface of the laterally extending reinforcement member 20 (see e.g. FIG. 2).

The ramp lifter device 10 further includes a pivot rod, indicated generally at 37, extending laterally across and interconnecting the level arms 22, 24. The pivot rod 37 comprises a tubular rod secured by welding or other means to the top surface of the lever arms, 22, 24 (See e.g. FIG. 2). Each end of the pivot rod 37 includes a greased sleeve 39 rotatingly secured thereto. The sleeve 39 is secured between a stop washer 41A welded along the length of the pivot rod and a lock nut or washer 41B attached to each end of the pivot rod. The pivot rod 37 and the reinforcement member 20 are attached across the lever arms 22, 24 in a substantially parallel relationship.

Figure 3:
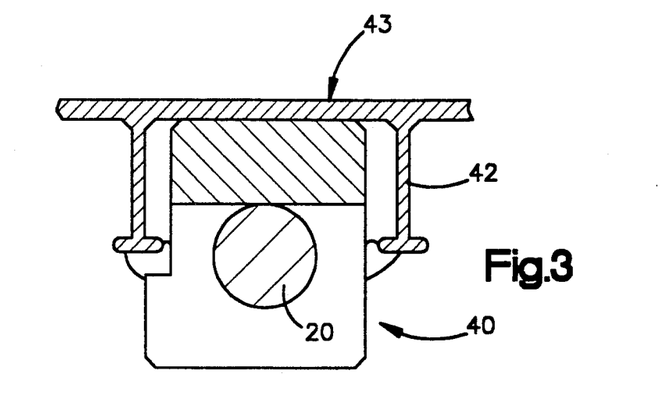
FIG. 3 is a side close-up view of the bracket for the reinforcement member, taken along the plane described substantially by the lines 3—3 of FIG. 1, illustrating the bracket attached to a loading ramp.

The reinforcement member 20 is adapted to be pivotally attached to the bottom side of a conventional loading ramp. For this purpose, a pair of conventional brackets, for example as indicated generally at 40 in FIG. 3, can be welded or otherwise fastened to cross members 42 on the bottom surface of a ramp, indicated generally at 43. The brackets 40 are attached to opposite sides of the ramp and are each adapted to rotatingly receive an end of the reinforcing member 20, as illustrated in FIG. 1.

Figure 4:
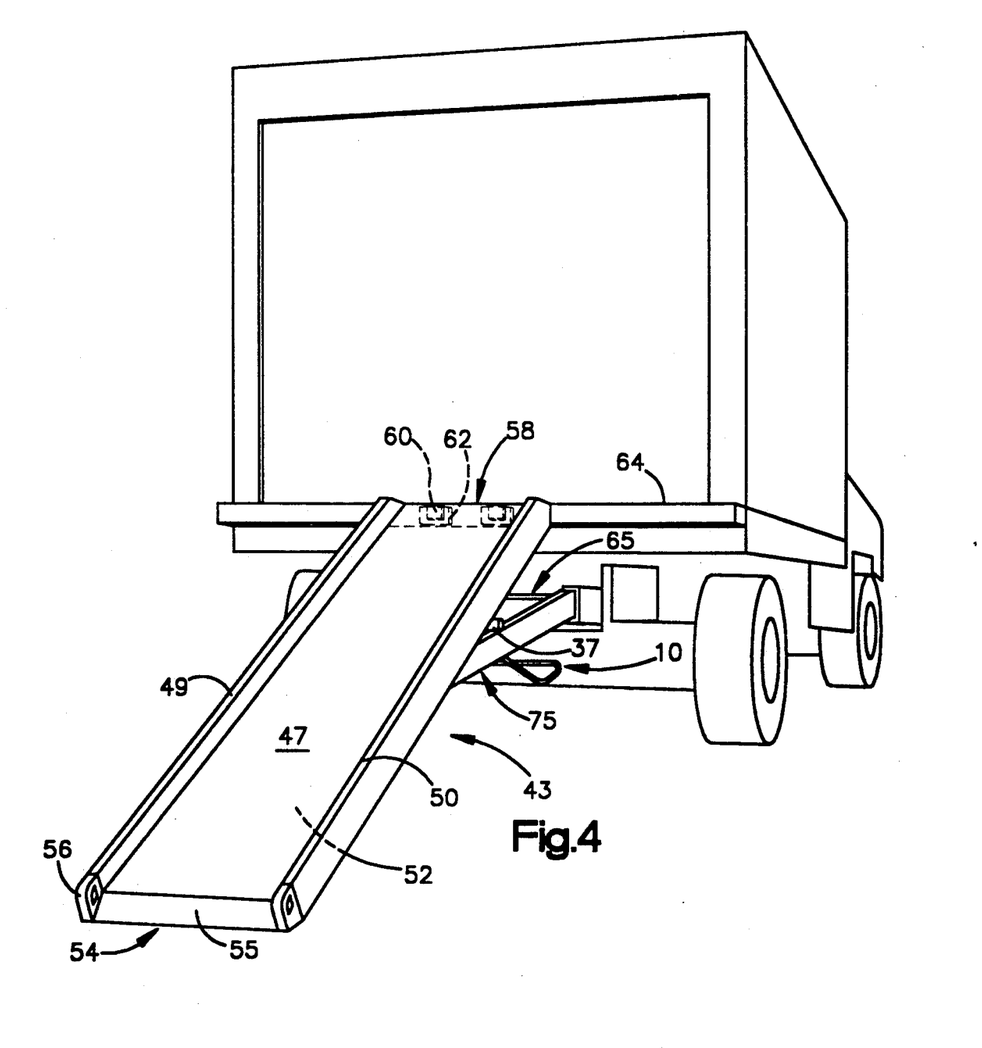
FIG. 4 is a rear perspective view of the loading ramp illustrating the ramp attached to the end of a vehicle body.

Referring now to FIG. 4, the loading ramp 43 is conventional in design and is preferably manufactured by the Todco Company under the models GRATE ALUMINUM open-surface design, or TWO-WAY solid surface design, although other ramps are within the scope of this invention. The loading ramp is preferably designed to be used in the loading and unloading of cargo from the rear of a truck or trailer, however, it is also within the scope of this invention to use the ramp in other applications, such as in railroad cars or other cargo transportation vehicles. Additionally, the loading ramp can be located at the side door of such a transportation vehicle to facilitate loading and unloading of cargo therefrom.

The loading ramp includes a top, skid-resistant surface, indicated generally at 47, side rails 49, 50, extending longitudinally along both edges of the ramp, and a bottom surface 52. The forward end of the ramp, indicated generally at 54, includes a front angled lip 55 which facilitates pushing hand trucks or dollies on the ramp, and conventional safety grip handles 56 formed or bolted to the ramp rails 49, 50. The forward end of the ramp may also include rollers (not shown) to facilitate the insertion and removal of the ramp from the storage area, as described herein in more detail.

The rear end of the loading ramp, indicated generally at 58, includes a coupling device, such as ramp hooks 60, bolted or otherwise secured to the ramp. The ramp hooks are adapted to be received in cooperating ramp pockets 62 formed in the rear edge of the vehicle body floor 64.

Figure 5:
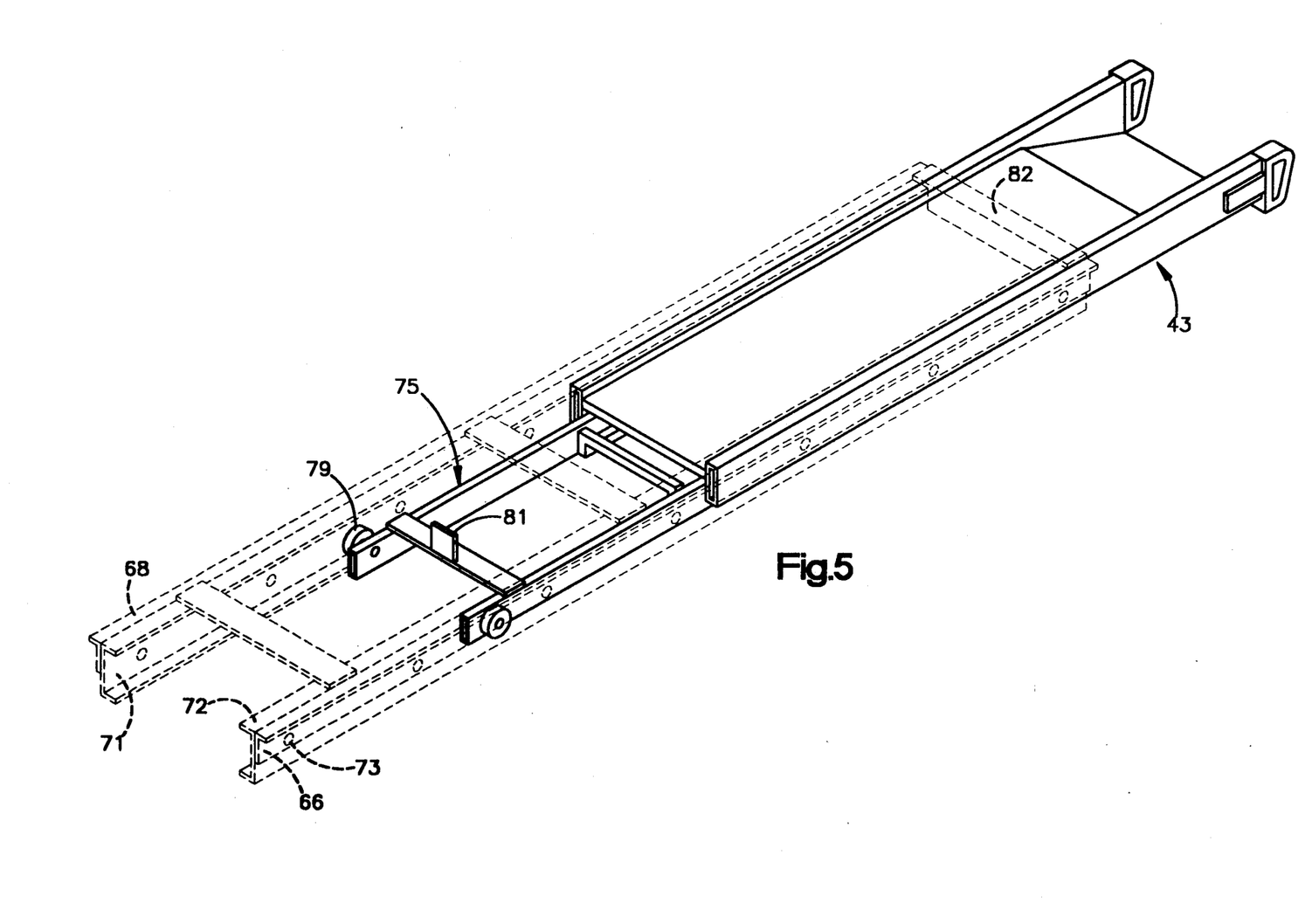
FIG. 5 is a side elevational view of a ramp lifter device of FIG. 6, illustrating the end of the ramp partially withdrawn from the ramp carrier box.

The loading ramp is adapted to be received within a storage area, indicated generally at 65, during transportation of the cargo. To this end, as illustrated in FIG. 5, the ramp 43 is received between opposing longitudinal frame members 66, 68 of the vehicle body chassis. The opposing frame members 66, 68 include C-shaped brackets 71, 72, attached to the frame members by bolts 73 and extending longitudinally therealong. The brackets 71, 72 extend longitudinally along the frame members 66, 68 and form a ramp carrier box for receiving the loading ramp. When the ramp is in its stored position, a conventional spring-loaded safety clamp (not shown) securely locks the ramp within the storage area. An exemplary storage arrangement is shown in U.S. Pat. No. 4,929,018, the specific storage arrangement of which is incorporated herein by reference.

Referring again to FIG. 1, the loading ramp 43 further includes a conventional ramp carriage, indicated generally at 75, which is adapted to facilitate insertion and removal of the ramp from the storage area 65 (FIG. 4). To this end, the ramp carriage 75 includes an extension reinforcement member 76 pivotally secured to a bottom bracket on the ramp. The extension reinforcement member 76 is attached to the ramp at a location slightly forwardly from the ramp lifter device attachment, and extends laterally across and interconnects two substantially parallel extension rods 77, 78.

The extension rods 77, 78, extend outwardly from opposite ends of the extension reinforcement member 76, and include rollers 79 rotatingly attached to the distal ends of each rod. The rollers 79 are adapted to be slidingly received along the bottom, inner surface of the C-shaped brackets 71, 72, as illustrated in FIG. 5, and are adapted to facilitate removal of the ramp from the storage area 65 (FIG. 4).

Figure 6:
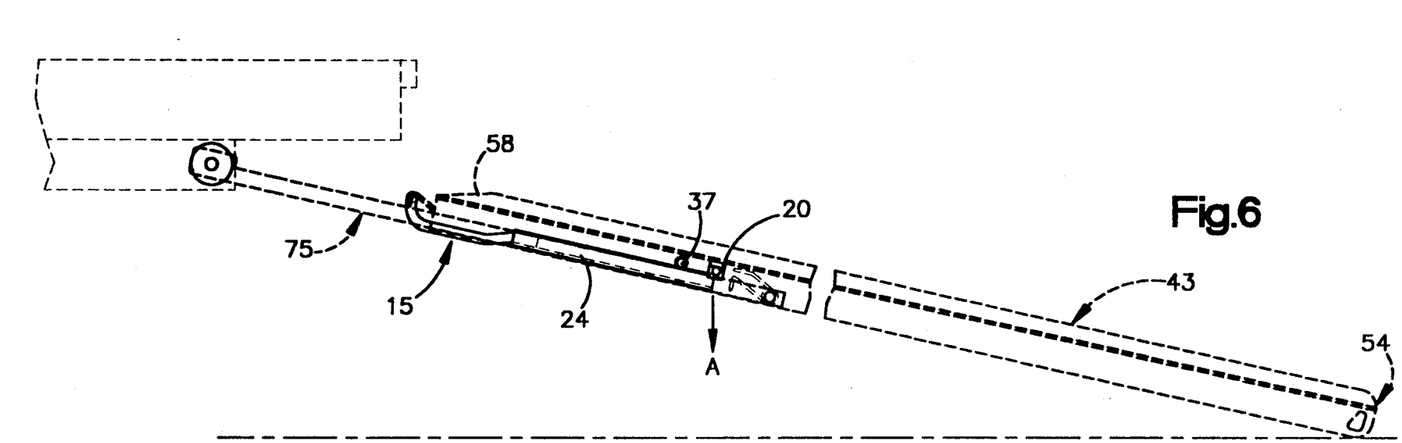
FIG. 6 is a side elevational view of the ramp lifter device, illustrating the ramp in its initial extended orientation.

The operation of the ramp lifter device for elevating the loading ramp is as follows. To initially withdraw the ramp from the storage area, the operator grasps handles 56 (FIG. 4) and pulls the ramp outwardly, away from the vehicle body. The ramp rollers 79 slide along the C-shaped brackets 71, 72 as the ramp is withdrawn from the storage area. The forward end 54, which is located remote from the vehicle body, is then set on the ground, as illustrated in FIG. 6. The ramp carriage 75 supports the rear end 58 proximate to the vehicle body at substantially the height of the ramp carrier box. A safety stop 81 (FIG. 5) cooperates with an angle bar 82 on the vehicle body chassis to prevent the unintentional removal of the loading ramp 43 from the ramp carrier box. In this orientation, the weight of the loading ramp biases the loading ramp and the ramp carriage downwardly at their point of attachment (e.g. laterally along extension reinforcement member 76, as shown generally at "A"), into a substantially co-planar relationship.

When the loading ramp is stored within the ramp carrier box, and also when the ramp is initially withdrawn from the box, the ramp lifter device is biased into a substantially co-planar relationship with the loading ramp and the ramp carriage. In particular, the extension rods 77, 78 (FIG. 1), on the ramp carriage engage the underside of pivot rod 37 on the ramp lifter device, and cause the pivot rod 37, and hence the ramp lifter device, to be maintained in a substantially coplanar relationship with the loading ramp and the ramp carriage.

Figure 7:
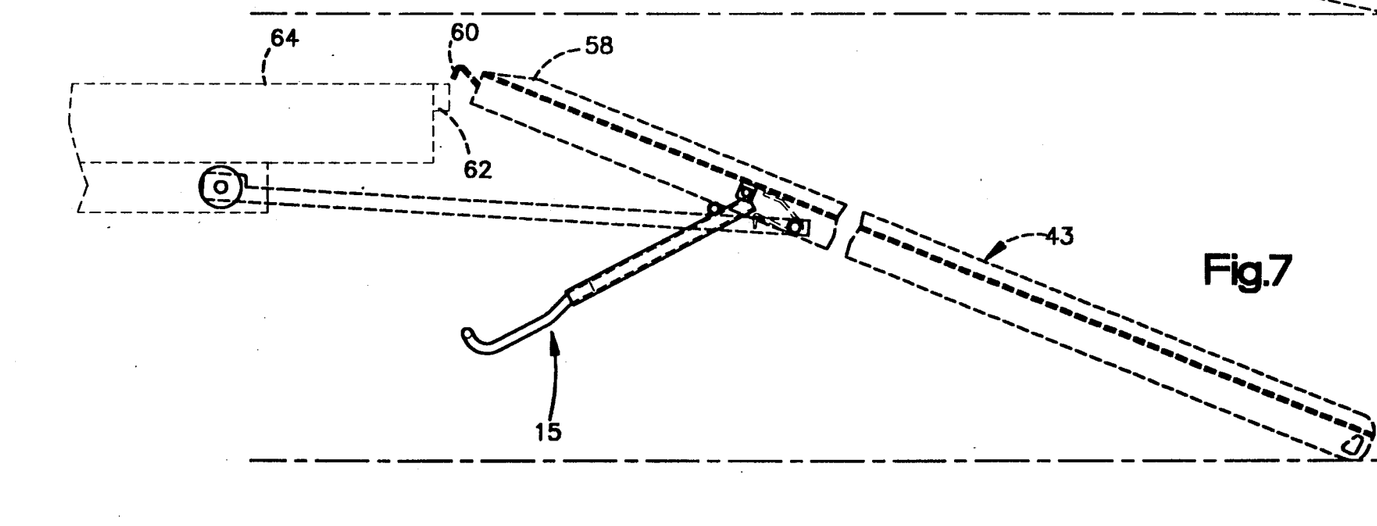
FIG. 7 is a side elevational view of a ramp lifter device of FIG. 6, illustrating the ramp in its elevated orientation.

To elevate the rear end 58 of the ramp to the floor height of the vehicle body, the operator initially grasps the handle 15 of the ramp lifter device and applies a downward force. The downward force on the handle forces the pivot rod 37 against the top surface of the ramp carriage extension rods 77, 78. The greased sleeves 39 on the pivot rod are adapted to roll along the extension rods to provide a fulcrum movement for the ramp lifter device. The lever arms 22, 24 on the ramp lifter device are pivoted about the pivot rod 37 to thereby pivot the reinforcement member 20 upwardly, and hence elevate the rear end of the ramp. Additional downward force on the handle 15 of the ramp lifter device elevates the ramp upwardly beyond the height of the floor 64 of the vehicle body, as illustrated in FIG. 7.

Figure 8:
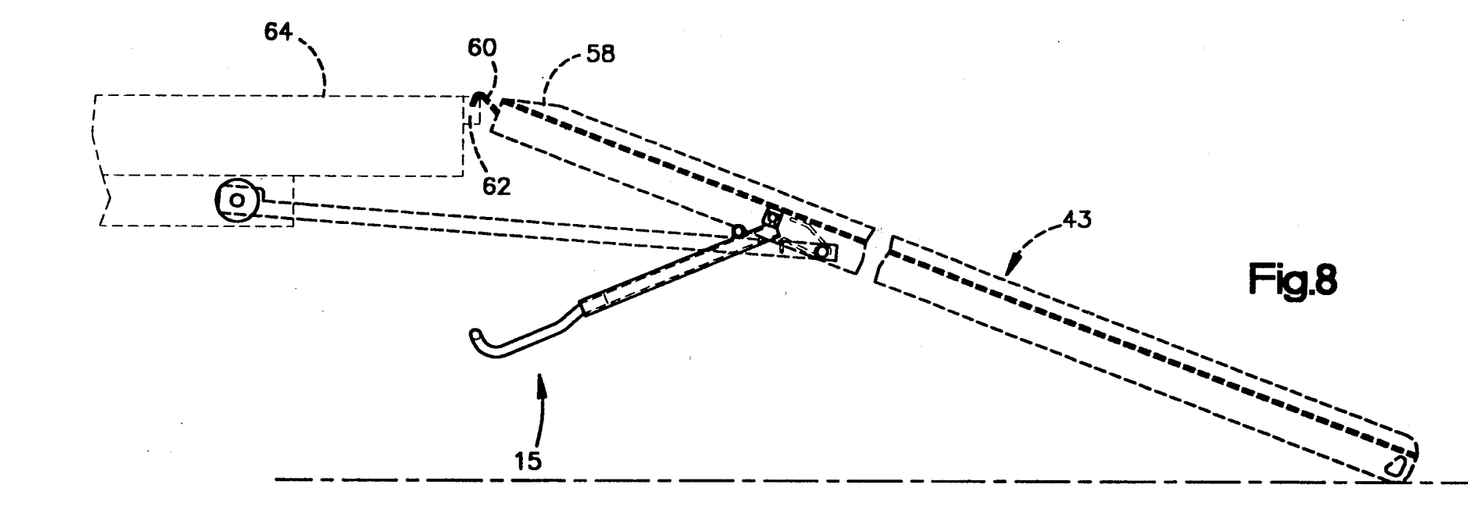
FIG. 8 is a side elevational view of the ramp lifter device of FIG. 6, illustrating the end of the ramp at the floor height of the vehicle body.

With a free hand, the operator then grasps an edge of the elevated ramp and pulls the ramp forwardly until the downwardly extending ramp hooks 60 are substantially vertically aligned with the ramp pockets 62. The operator then moves the ramp handle 15 upwardly, which lowers the rear end 58 of the ramp until the ramp hooks 60 are received within the ramp pockets 62, as illustrated in FIG. 8. At this point, the rear end 58 of the ramp is at substantially the same height as the vehicle body floor 64, which allows for loading and unloading of cargo from the rear of the vehicle body.

To store the loading ramp, the procedure is reversed. The operator initially provides a downward force on the handle of the ramp lifter device, causing the pivot rod to engage the ramp carriage extension rods and lift the end of the ramp upwardly, thereby disengaging the ramp hooks from the ramp pockets. The operator then manually moves the ramp outwardly from the vehicle body, and then moves the ramp handle upwardly, to thereby lower the ramp to the stored orientation at the level of the ramp carrier box, as illustrated in FIG. 6.

If the weight of the ramp is such that applying a downward force on the handle to lift the ramp is difficult, then torsion springs, indicated generally at 86 in FIG. 2, can be included on both ends of the extension reinforcement member 76, and extend along the ramp and the ramp carriage extension rods. One leg 87 of each spring can be attached along the bottom surface of the ramp, while the other leg 88 of each spring can be attached along an extension rod.

Accordingly, a simple, yet unique method of raising the end of a loading ramp to the floor height of a vehicle body is provided by the present invention. The ramp lifter device reduces fatigue and decreases the chance of injury that can be created by manually lifting the end of a loading ramp to the floor height of a vehicle body.

The principles, preferred embodiments, and modes of operation of the present invention have been described in the foregoing specification. The invention which is intended to be protected herein, should not, however, be construed as limited to the particular form described as it is to be regarded as illustrative rather than restrictive. Variations and changes may be made by those skilled in the art without departing from the spirit of the present invention. Accordingly, the foregoing detailed description should be exemplary in nature and not as limiting to the scope and spirit of the invention as set forth in the appended claims.

What is claimed is:

1. An apparatus for elevating a loading ramp to the floor height of a vehicle body, comprising:
    a storage compartment disposed below the floor height of the vehicle body,
    the loading ramp having a ramp carriage and being moveable between a storage position wherein the ramp is disposed within said storage compartment and a withdrawn position wherein the ramp extends from a height below the floor height of the vehicle body and ground,
    the loading ramp including a proximal end disposed proximate to the vehicle body and a distal end disposed remote from the vehicle body and set on the ground when said loading ramp is in the withdrawn position,
    a lifting device pivotally connected to the loading ramp, said lifting device having a pivot rod engaging a portion of the ramp carriage to elevate the proximal end of the loading ramp from the withdrawn position to the floor height of the vehicle body, and
    a coupling device attached to the proximal end of the loading ramp which cooperates with a receiving device on the vehicle body to maintain the proximal end of the loading ramp at the floor height of the vehicle body, so that the loading ramp extends from the floor height of the vehicle body to the ground.

2. An apparatus for elevating a loading ramp to the floor height of a vehicle body as in claim 1, wherein the loading ramp includes a ramp carriage attached thereto, said ramp carriage including a first end and a second end, the first end pivotally attached to other loading ramp, and the second end slidingly received within said storage compartment in the vehicle body, said lifting device cooperating with the loadng ramp and said ramp carriage to elevate the proximal end of the loading ramp from the withdrawn position to the floor height of the vehicle body.

3. An apparatus for elevating a loading ramp to the floor height of a vehicle body as in claim 1, wherein said lifting device pivots around an axis formed by said pivot rod to elevate the proximal end of the loading ramp to the floor height of the vehicle body.

4. An apparatus for elevating a loading ramp to the floor height of a vehicle body as in claim 3, wherein said coupling device includes ramp hooks, and said cooperating receiving device includes ramp pockets, said ramp hooks being received in said ramp pockets to maintain the proximal end of the loading ramp at the floor height of the vehicle body.

5. An apparatus for elevating a loading ramp to the floor height of a vehicle body as in claim 1, wherein said coupling device includes ramp hooks, and said cooperating receiving device includes ramp pockets, said ramp hooks being received in said ramp pockets to maintain the proximal end of the loading ramp at the floor height of the vehicle body.

6. An apparatus for elevating a loading ramp to the floor height of a vehicle body, comprising:
    a storage compartment disposed below the floor height of a vehicle body,
    said loading ramp being moveable between a storage position wherein the ramp is disposed within said storage compartment, a withdrawn position wherein the ramp extends between a height below the floor height of the vehicle body and ground, and a loading position wherein the ramp extends from the floor height of the vehicle body and ground;

said loading ramp including a proximal end disposed proximate to the vehicle body and a distal end disposed remote from the vehicle body and set on the ground when the loading ramp is in the withdrawn position;

a ramp carriage including a first end and a second end, the first end of the ramp carriage pivotally attached to said loading ramp and the second end of the ramp carriage slidingly received within said storage compartment in the vehicle body; and a lifting device including a first end and a second end, the first end of said lifting device pivotally attached to the loading ramp, and the second end of said lifting device including a handle, wherein when said ramp is in said withdrawn position and said lifting device has a directed force applied to the handle away from said ramp, the lifting device engages a portion of said ramp carriage and elevates the proximal end of the loading ramp to the floor height of the vehicle body.

7. An apparatus for elevating a loading ramp to the floor height of a vehicle body as in claim 6, wherein said lifting device has a force applied downwardly to the handle away from the ramp.

8. An apparatus for elevating a loading ramp to the floor height of a vehicle body, comprising:

a storage compartment disposed below the floor height of the vehicle body.

the loading ramp being moveable between a storage position wherein the ramp is disposed within said storage compartment and a withdrawn position wherein the ramp extends from a height below the floor height of the vehicle body and ground, the loading ramp including a proximal end disposed proximate to the vehicle body and a distal end disposed remove from the vehicle body and set on the ground when said loading ramp is in the withdrawn position, said proximal end of the loading ramp including a ramp carriage having a first end and a second end, the first end of the ramp carriage being pivotally attached to the loading ramp, and the second end of the ramp carriage being slidingly received within said storage compartment in the vehicle body, a lifting device having a pivot rod, said pivot rod engaging a portion of said ramp carriage to elevate the proximal end of the loading ramp from the withdrawn position to the floor height of the vehicle body, and a coupling device connected to the proximate end of the ramp to cooperate with a receiving device on the vehicle body to maintain the proximal end of the loading ramp at the floor height of the vehicle body, so that the loading ramp extends from the floor height of the vehicle body to the ground.

9. An apparatus for elevating a loading ramp to the floor height of a vehicle body as in claim 8, wherein said lifting device pivots around an axis formed by said pivot rod to elevate the proximal end of the loading ramp to the floor height of the vehicle body.

10. An apparatus for elevating a loading ramp to other floor height of a vehicle body as in claim 9, wherein said coupling device includes ramp hooks, and said cooperating receiving device includes ramp pockets, said ramp hooks being received in said ramp pockets to maintain the proximal end of the loading ramp at the floor height of the vehicle body.

* * * * *

UNITED STATES PATENT AND TRADEMARK OFFICE
CERTIFICATE OF CORRECTION

PATENT NO. : 5,133,634
DATED : July 28, 1992
INVENTOR(S) : Eli L. Gingrich, Theodore A. Lutton It is certified that error appears in the above-identified patent and that said Letters Patent is hereby corrected as shown below:

Col. 6, line 36 please delete "loadng" and insert therefore --loading--

Signed and Sealed this

Twenty-fourth Day of August, 1993

Attest:

BRUCE LEHMAN

Attesting Officer     Commissioner of Patents and Trademarks